United States Patent [19]
Crisler

[11] Patent Number: 5,456,958
[45] Date of Patent: Oct. 10, 1995

[54] DETACHABLE HOOD MOUNTED VEHICLE ORNAMENT

[76] Inventor: John K. Crisler, 815-B N. Walnut, Lansing, Mich. 48906

[21] Appl. No.: 939,666

[22] Filed: Sep. 3, 1992

[51] Int. Cl.⁶ .................................................. B60R 13/00
[52] U.S. Cl. ................................ 428/31; 40/591; 280/727
[58] Field of Search ................................ 428/31; 40/591; 280/727; 248/503

[56]  References Cited

U.S. PATENT DOCUMENTS

| | | | |
|---|---|---|---|
| 3,813,113 | 5/1974 | Burnham | 428/31 X |
| 3,968,977 | 7/1976 | Wilfert | 428/31 X |
| 4,349,591 | 9/1982 | Kanamori | 428/31 |
| 4,400,417 | 8/1983 | Kanamori et al. | 428/31 |
| 4,560,597 | 12/1985 | Kanamori | 428/31 |
| 4,913,941 | 4/1990 | Tedrahn | 428/31 |
| 5,002,251 | 3/1991 | Kranenberg | 248/503 |
| 5,288,557 | 2/1994 | Perlman et al. | 428/31 |
| 5,316,808 | 5/1994 | Prunty | 428/31 |

FOREIGN PATENT DOCUMENTS 1133297  11/1968  United Kingdom.

*Primary Examiner*—Henry F. Epstein
*Attorney, Agent, or Firm*—Ian C. McLeod

[57]  ABSTRACT

A tiltable hood ornament (10) which is detachable is described. The tiltable hood ornament (10) includes a base (12) which is mounted through the hood (15) of the vehicle. An adaptor (22) is mounted onto the base (12) and held in place by a spring assembly (27) which is formed by a split pin (26) and a coil spring (28). An ornament (35) is provided with an extension portion (35B) which is encircled by a collar (30) and is mounted on the adaptor (22). The collar (30) is positioned in the adaptor (22) by a locating screw (32) which extends into a slot (22K) in the adaptor (22). The ornament (35) and collar (30) are held in place in the adaptor (22) by a detent (40). The spring assembly (27) allows the adaptor (22), collar (30) and ornament (35) to tilt in response to the application of a force. The detent (40) provides for quick release of the ornament (35) and collar (30) from the adaptor (22) in response to a vertical pulling force on the ornament (35).

36 Claims, 3 Drawing Sheets

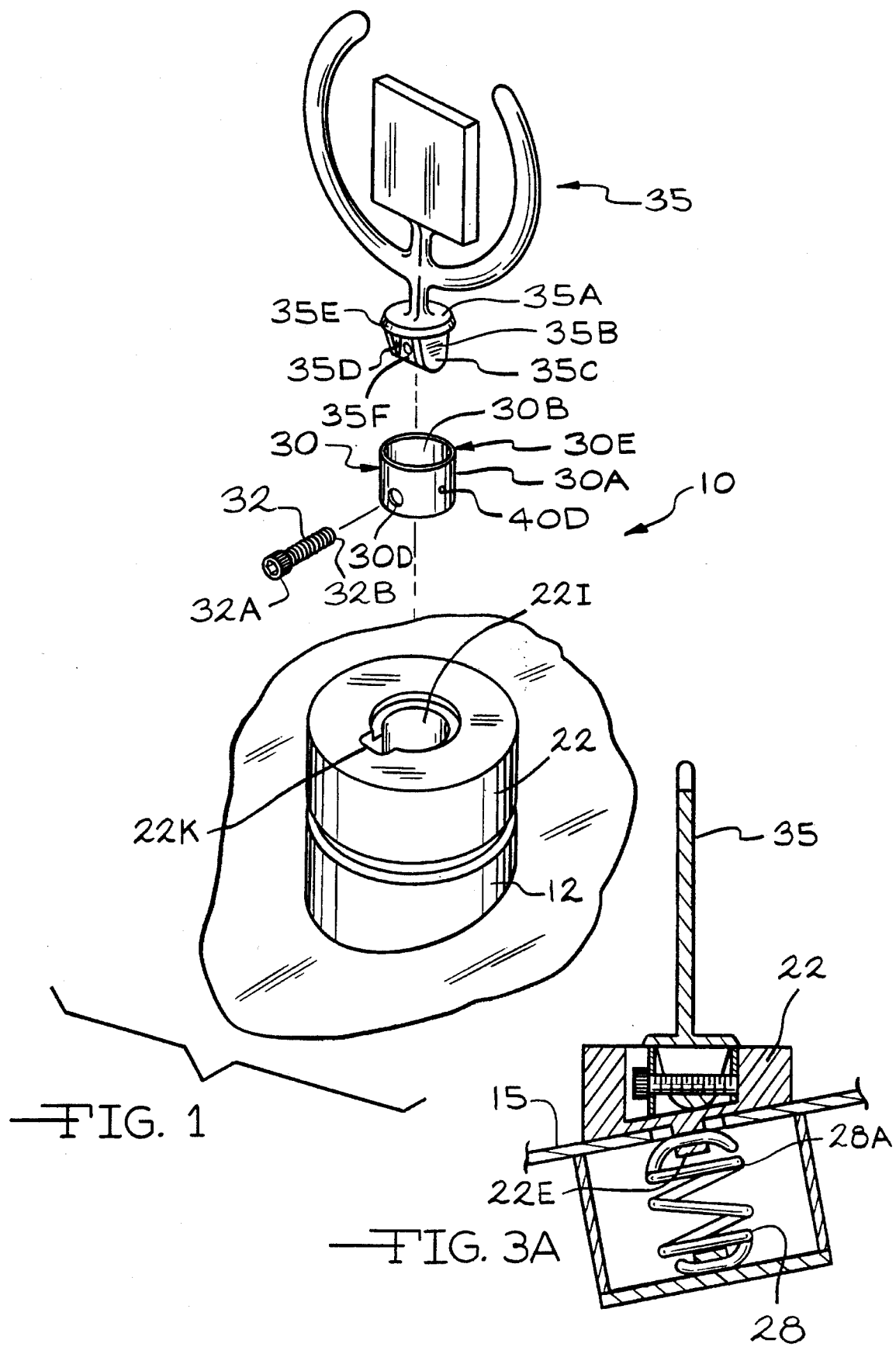

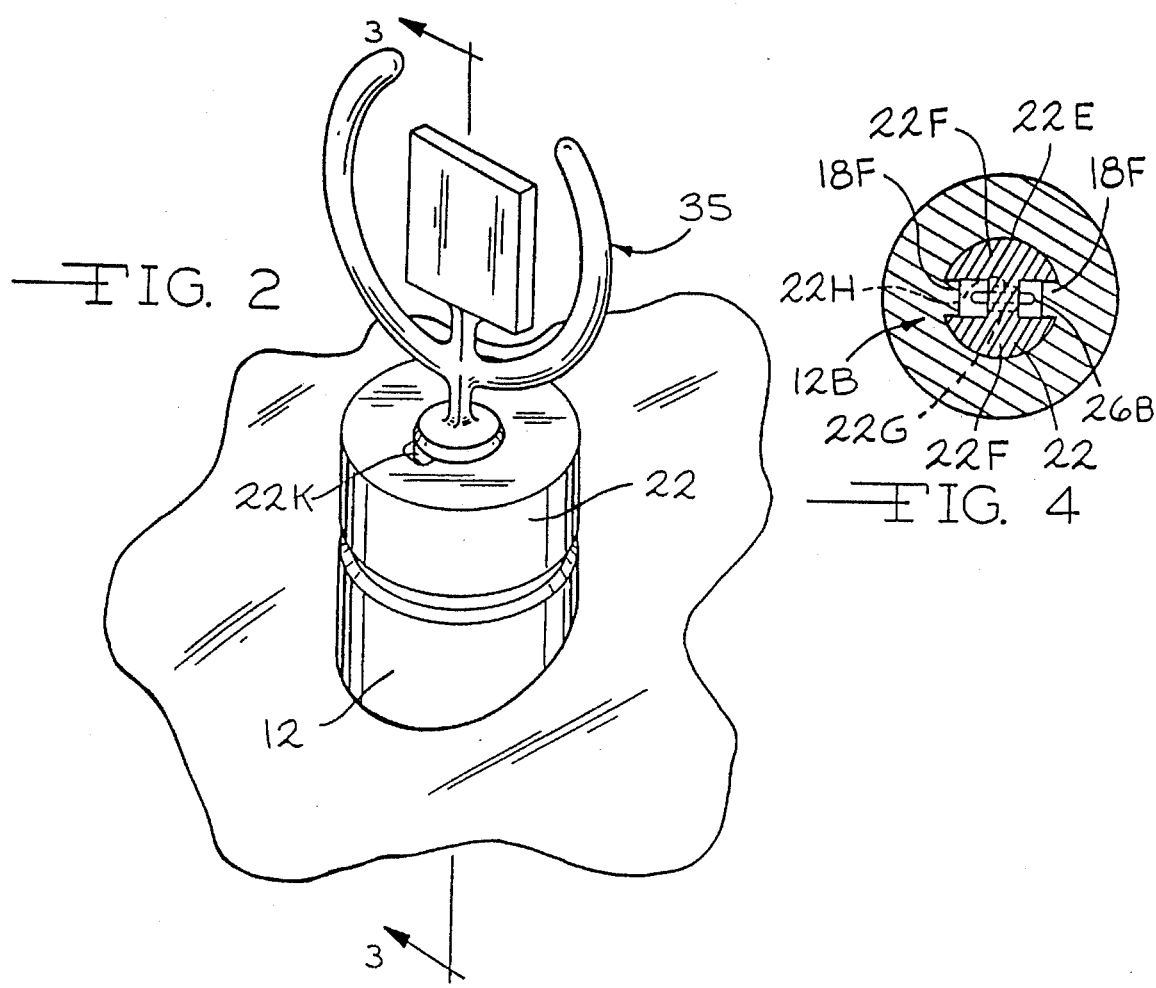
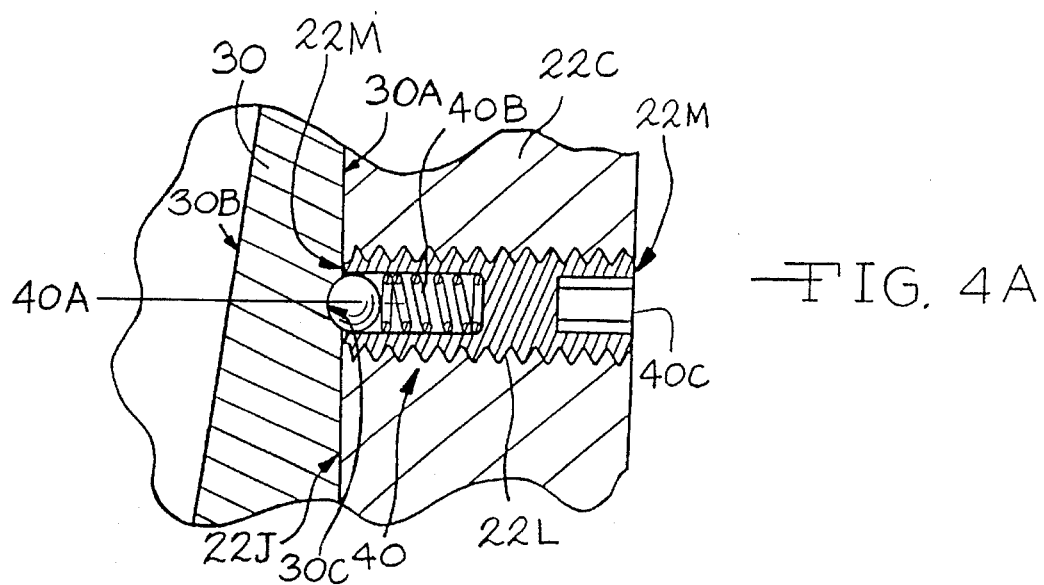

5,456,958

DETACHABLE HOOD MOUNTED VEHICLE ORNAMENT

BACKGROUND OF THE INVENTION

1. Field of the Invention

The present invention relates to a removeable and tiltable vehicle hood ornament. More particularly, this invention relates to a device which can be used with the ornament currently used on the vehicle and which retains the safety factor created by the tiltability of the ornament while creating an additional security to the owner of the vehicle by creating the ability to easily and quickly remove the ornament when leaving the vehicle unattended, thus to prevent the possibility of someone stealing the ornament.

2. Prior Art

The prior art has described various types of tiltable vehicle hood ornaments and removeable vehicle hood ornaments. Illustrative of the prior art devices are U.S. Pat. Nos. 3,813,113 to Burnham; 3,968,977 to Wilfert; 4,349,591 to Kanamori; 4,400,417 to Kanamori et al 4,560,597 to Kanamori; 4,913,941 to Tedrahn and 5,002,251 to Kranenberg. British Patent No. 1,133,297 to Ancliff is also illustrative of the tiltable vehicle hood ornament.

U.S. Pat. No. 3,813,113 to Burnham illustrates a retractable ornament.

U.S. Pat. No. 3,968,977 to Wilfert describes a tiltable radiator figure. The device comprises a radiator figure or emblem which is pivotably mounted within a recess provided in the engine hood permitting a tilting of the radiator figure into the recess.

U.S. Pat. No. 4,349,591 to Kanamori describes a tiltable ornament constructed out of a synthetic resin. A prior art tiltable ornament is also described.

U.S. Pat. No. 4,400,417 to Kanamori shows a tiltable ornament. The device comprises an ornament and a base mounted upon the vehicle. The base extends down into the vehicle wherein a coil spring and split pin assembly are attached to the ornament which allows for the tilting of the ornament.

U.S. Pat. No. 4,560,597 to Kanamori describes a tiltable ornament whereupon the tilting assembly, a coil spring and split pin is mounted through the ornament and does not extend through the surface of the vehicle upon which it is mounted.

U.S. Pat. No. 4,913,941 to Tedrahn describes a removeable hood ornament. The device comprises an ornament mounted on one end of a shaft. The ornament is mounted onto the hood through the use of a key member on the opposite end of the shaft which is rotated to lock the ornament in position and to unlock the ornament. The key member fits into the keyhole in a base mounted on the hood, thus rigidly mounting the ornament to the hood.

U.S. Pat. No. 5,002,251 to Kranenberg describes a retaining device for a hood ornament which allows for the removal of the ornament. The device comprises an ornament mounted on a rigid friction rod, and a retaining assembly. The retaining assembly consists of a retaining disc, a spring, a spring base disc, an actuator cable and a cable ferrule. The rigid friction rod is inserted into the retaining assembly and enters an aperture of the retaining disc which guides and directs the rod end through the center of the spring and into an aperture of the spring base disc. The pulling force exerted on the actuator cable causes the ferrule to exert a downward eccentric pressure on the retaining disc, when subjected to such off-center pressure, the retaining disc is pulled down in a fashion causing an edge of the retaining disc to tilt into the rigid friction rod.

British Pat. No. 1,133,297 to Ancliff shows a tiltable vehicle ornament. The device comprises an ornament, a base, a spring and a rod. The ornament is mounted onto the base through the use of the spring and the flexibility of the spring allows the ornament to tilt when a force is applied. The rod is connected to the ornament and is used to prevent damage to the spring due to over exertion.

Although the above devices are adequate, there remains the need for a device which combines the ability to remove the ornament with the necessary tiltability to retain the safety aspects of the ornament. The present invention enables the owner to easily remove the ornament when leaving the vehicle unattended. The detached section of the device is compact and self-contained and is therefore able to be carried in a pocket or a purse or even left within the vehicle.

OBJECTS

It is therefore an object of the present invention to provide a hood ornament which is removeable and tiltable. Further, it is an object of the present invention to provide a hood ornament that is easily removeable by pulling and exerting a vertical force and which is fully tiltable. Further, it is an object of the present invention to provide a hood ornament that when removed from the vehicle is compact and self-contained to enable the detached section to be easily and safely carried. Furthermore, it is an object to provide a device which can be used with existing hood ornament assemblies to provide a hood ornament which is tiltable and removeable. These and other objects will become increasingly apparent by reference to the following descriptions and to the drawings.

BRIEF DESCRIPTION OF THE DRAWINGS

FIG. 1 is a separated perspective view of a tiltable hood ornament 10 of the present invention.

FIG. 2 is a front perspective view of the assembled tiltable hood ornament 10 of the present invention.

FIG. 3A is a cross-sectional view of an alternate configuration of an assembled tiltable hood ornament 10 showing the mounting of the adaptor 22 directly onto the hood 15 and the attachment of the coil spring 28 to the protrusion 22E of the adaptor 22.

FIG. 4 is a cross-sectional view along the line 4—4 showing the attachment of the split pin 26 to the protrusion 22E of the adaptor 22.

FIG. 4A is an enlarged view of the detent 40 showing the ball 40A and spring 40B which is 90° around the collar 30 from the axis deferred by the locating screw 32 as shown in FIG. 1.

GENERAL DESCRIPTION

Figure 3:
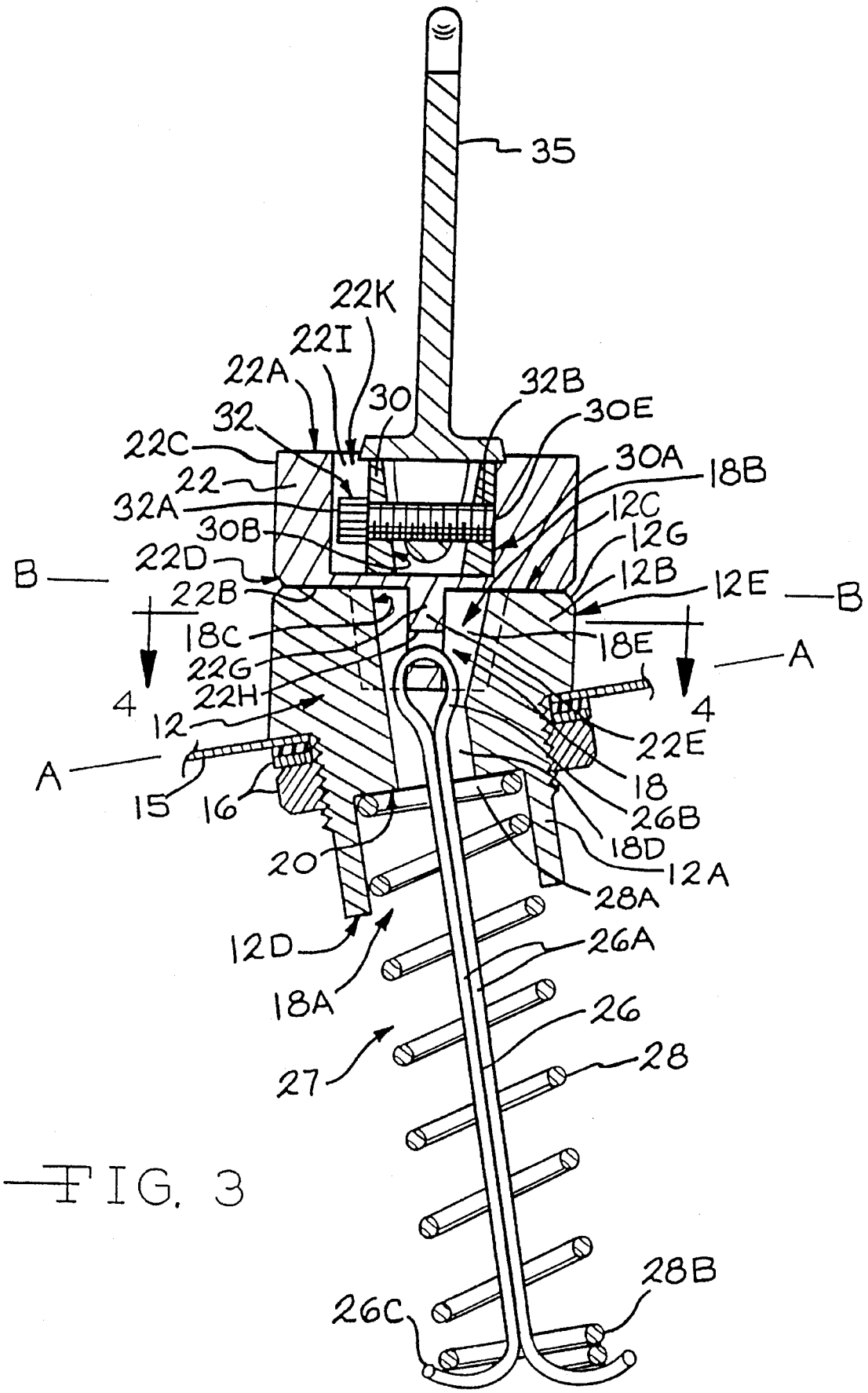
FIG. 3 is a cross-sectional view along line 3—3 of FIG. 2 showing the interconnection of the hood 15, base 12, adaptor 22, collar 30 and ornament 35 along with the spring assembly 27, and the locating screw 32.

The present invention relates to an assembly adapted for mounting on an engine hood of a vehicle and providing a quick release of a tiltable hood ornament which comprises: an adaptor means tiltably mounted on the hood of the vehicle having two opposed ends, one end mounted adjacent to the hood of the vehicle and the other end having a connector and with at least one outside side between the ends; a hood ornament with a projection at an end which fits into the connector of the adaptor means in a male-female relationship, wherein a locating means is provided between the adaptor means and the projection which prevents rotation of the ornament and projection in the adaptor means and wherein a detent means is provided between the projection of the ornament and the adaptor means to hold the projection of the ornament in the connector until released by pulling the ornament away from the other end of the adaptor means; and resilient means mounted on the adaptor means and hood so as to bias the adaptor means towards the hood.

Further, the present invention relates to an assembly adapted for mounting on an engine hood of a vehicle and providing a quick release of a tiltable hood ornament which comprises: a base means adapted to be mounted on the hood of the vehicle with an opening between opposed ends and with at least one side between the ends; an adaptor means tiltably mounted on the base means; a hood ornament mounted on the adaptor means by male and female connectors and to allow the ornament to be pulled from and separated from the adaptor means by pulling the connectors apart wherein there is a detent means between the connectors to hold them together; and resilient means mounted on the base means and on the adaptor means which biases the adaptor means towards the base means.

In particular, the present invention relates to an assembly adapted for mounting on an engine hood of a vehicle and providing a quick release of a tiltable hood ornament which comprises: a base means adapted to be mounted on the hood of the vehicle with an opening between opposed ends of the base means and with at least one side between the ends; an adaptor means tiltably mounted on the base means and having two opposed ends, one end mounted on the base means and the other end having a recess and with at least one outside side between the ends; a hood ornament with a projection at an end which fits into the recess of the adaptor means in a male-female relationship, wherein a locating means is provided between the adaptor means and the projection which prevents rotation of the ornament and projection in the adaptor and wherein a detent means is provided between the projection of the ornament and the adaptor means to hold the projection of the ornament in the recess until released by pulling the ornament away from the other end of the adaptor means; and resilient means mounted on the base means opposite the adaptor means and connected to the adaptor means through the opening in the base means so as to bias the adaptor means towards the base means.

Finally, the present invention in particular relates to an adaptor for providing a quick release of a tiltable hood ornament on a vehicle which comprises: a body having an upper surface and a lower surface with at least one side between the upper surface and the lower surface and with a recess located in the upper surface; a detent means mounted in the body for holding the ornament in the recess until released by pulling the ornament from the recess; and an attachment means mounted on the bottom surface of the body for attaching to a resilient means for holding the ornament on the hood.

SPECIFIC DESCRIPTION

FIGS. 1 to 3 show the preferred embodiment of the tiltable hood ornament 10 of the present invention. As shown particularly in FIGS. 1 and 2, the tiltable hood ornament 10 is comprised of a base 12 upon which is mounted an adaptor 22, a collar 30 having a locating screw 32 and an ornament 35.

FIG. 3 shows a cross-section of the preferred embodiment of the device 10. The base 12 is a single unitary piece preferably cylindrical and comprised of a proximal section 12A and a distal section 12B and a top surface 12C and a bottom surface 12D separated by an outer surface 12E. The base 12 is mounted onto the hood 15 of the vehicle through an opening, the underside of which is provided with a nut and washer assembly 16. There are a number of ways by which the base 12 could be mounted onto the hood 15, in the preferred embodiment, the base 12 is attached by inserting the proximal section 12A of the base 12 into the opening in the hood 15. The proximal section 12A of the base 12 is smaller in diameter than the distal section 12B and is provided with threads on the outer surface 12E. The threads are greater in length than that needed to fully engage all the threads in the nut and washer assembly 16 in the opening in the hood 15. The proximal section 12A extends downward through the opening in the hood 15. The nut and washer assembly 16 threadably mate with the proximal section 12A to firmly secure the base 12 to the hood 15.

The distal section 12B of the base 12 extends above the hood 15. The line of contact between the bottom surface 12D of the distal section 12B and the hood 15 is parallel to the axis A—A, the horizontal axis of the hood 15. As the distal section 12B extends away from the hood 15, the outer surface 12E of the distal section 12B is angled such that the top surface 12C of the base 12 is in the plane parallel to axis B—B, the horizontal axis of the vehicle. This angling is necessary so that the ornament 35 to be discussed in detail later, is vertical with respect to the vehicle, and not vertical with respect to the hood 15 of the vehicle. It is understood that in vehicles on which the hood 15 is not angled with respect to the vehicle or such an angle is desired, such an angling of the distal section 12B of the base 12 would be unnecessary.

A bore 18 extends vertically through both distal and proximal sections 12A and 12B of the base 12. The bore 18 has an opening 18A in the bottom surface 12D of the base 12 and an opening 18B in the top surface 12C of the base 12 with an inner wall 18C extending between the two openings 18A and 18B. The bore 18 extends upward perpendicular to axis A—A from the opening 18A in the bottom surface 12D of the base 12. When the bore 18 reaches the portion of the proximal section 12A, at which the outer surface 12E is threadably mated with the nut and washer assembly 16 of the hood 15, the diameter of the bore 18 is abruptly reduced to approximately half its original diameter. This abrupt narrowing forms a shoulder 20 within the bore 18. The reduced diameter portion 18D of the bore 18 extends upward through the proximal section 12A of the base 12 and into the distal section 12B. Once the bore 18 reaches the plane parallel to the axis B—B, on which is also the highest point of contact between the hood 15 and the distal section 12B, one side of the inner wall 18C of the bore 18 angles away from the vertical line perpendicular to the horizontal axis A—A of the hood 15 and forms an angled portion 18E of the bore 18. This angling is to compensate for the angling of the base 12. As a result, the opening 18B in the top surface 12C of the base 12 is centered around the vertical line perpendicular to the horizontal axis B—B of the ornament 35 and the angled portion 18E of the base 12 extends downward into the distal section 12B along the vertical line while the remaining portion of the bore 18 extends along the vertical line perpendicular to the axis A—A.

An adaptor 22 which is comprised of an upper surface 22A and lower surface 22B which are parallel and spaced apart by sidewall 22C is mounted to the top surface 12C of the base 12. The adaptor 22, has a circular cross-section (preferably) with a diameter equal to the diameter of the distal section 12B of the base 12. The top surface 12C of the base 12 has a diameter which is less than the diameter of the distal section 12B. The diameter of a lower surface 22B of the adaptor 22 is less than the outer diameter of the adaptor 22. These reductions are caused by a beveling of the perimeter edges 12G and 22D of both the top surface 12C of the base 12 and the lower surface 22B of the adaptor 22. The perimeter edges 12G and 22D are beveled such that the top surface 12C of the base 12 and the lower surface 22B of the adaptor 22 have the same diameter to create a more aesthetically pleasing fit between the adaptor 22 and the base 12 as well as facilitating the tiltability of the adaptor 22 with respect to the base 12. In the alternate embodiment, as shown in FIG. 3A, the original construction of the tiltable ornament 35 does not involve the use of the base 12. Therefore, it is contemplated that in such circumstances the adaptor 22 would mount directly into the opening in the hood 15. The shape of the adaptor 22 would then be that which creates the most aesthetically pleasing fit between the adaptor 22 and the hood 15.

The lower surface 22B of the adaptor 22 is provided with a protrusion 22E which extends downward into the opening 18B of the bore 18 in the top surface 12C of the base 12. The protrusion 22E is intended to simulate the original extension portion 35B of the ornament 35, to be discussed later, such that the protrusion 22E will mount within the base 12 and utilize any features of the base 12 which are intended to increase the stability of the ornament 10. In the preferred embodiment, the protrusion 22E is comprised of two curved legs 22F (FIG. 4) connected by a central wall 22G which is provided with a hole 22H. The angled portion 18E of the bore 18 is provided with tabs 18F (FIG. 4) which extend between the curved legs 22F of the protrusion 22E and prevent the adaptor 22 from rotating in the base 12. The diameter of the angled portion 18E of the bore 18 is large enough that the protrusion 22E loosely fits and is able to tilt adjacent the inner wall 18C of the bore 18.

The protrusion 22E extends downward into the angled portion 18E of the bore 18. The adaptor 22 is mounted onto the base 12 by the protrusion 22E which is engaged by a spring assembly 27 which extends upward through the bore 18 into the hole 22H in the protrusion 22E. The spring assembly 27 is comprised of a split pin (retainer wire) 26 and a coil spring 28. The split pin 26 is comprised of two legs 26A which form a loop 26B at the top of the split pin 26. The split pin 26 extends upward through the bore 18 into the distal section 12B of the base 12 wherein it is attached to the protrusion 22E. FIG. 4 is a cross-section of the adaptor 22 mounted in the base 12 and shows the attachment of the adaptor 22 to the loop 26B of the split pin 26. The split pin 26 is attached through the hole 22H in the protrusion 22E by the loop 26B. The legs 26A of the split pin 26 extend downward from the loop 26B through the bore 18 in the base 12. The hole 22H in the protrusion 22E easily accommodates the loop 26B allowing the adaptor 22 to tilt forwards or backwards of the vehicle in reaction to an applied force.

The split pin 26 is encircled by a coil spring 28 which has a first and second end 28A and 28B. The coil spring 28 extends upward through the bore 18 in the base 12 encircling the split pin 26 until the first end 28A encounters the shoulder 20 formed by the reduction in the diameter of the bore 18. The diameter of the bore 18 at the opening 18A of the bottom surface 12D is such as to accommodate the coil spring 28. The reduction in diameter of the bore 18 prevents the coil spring 28 from extending further into the base 12 while allowing the split pin 26 to continue upward into the distal section 12B of the base 12. The second end 28B of the coil spring 28 is attached to the ends 26C of the legs 26A of the split pin 26. In the preferred embodiment, the ends 26C of the legs 26A of the split pin 26 are curled over the second end 28B of the coil spring 28 thereby attaching the split pin 26 to the coil spring 28 and holding the coil spring 28 in compression. When a force is applied to the adaptor 22, the spring assembly 27 allows the adaptor 22 to tilt and biases the adaptor 22 to the base 12. As the force is applied to the adaptor 22, the adaptor 22 pulls the split pin 26 upward. This upward movement urges the first end 28A of the coil spring 28 to become further compressed. When the force is removed, the coil spring 28 springs back pulling the split pin 26 and the adaptor 22 back to their normal position. In the alternate embodiment shown in FIG. 3A, the spring assembly 27 is comprised of only a coil spring 28. The first end 28A of the coil spring 28 is attached directly to the protrusion 22E of the adaptor 22. The coil spring 28 acts similarly to the split pin 26 and coil spring 28 of the preferred embodiment and reacts to an applied force with a similar response.

The upper surface 22A of the adaptor 22 contains a recess 22I centered around the vertical line perpendicular to the axis B—B. A collar 30 is mounted within the recess 22I and is comprised of sides which have an outer surface 30A and an inner surface 30B. The collar 30 is mounted into the recess 22I such that the outer surface 30A of the collar 30 is adjacent an inner wall 22J of the recess 22I (FIG. 4A). As shown in FIG. 1, the collar 30 has a locating screw 32 positioned within a first aperture 30D in the side of the collar 30. The locating screw 32 is preferably an allen head screw having a head 32A and a distal end 32B. The locating screw 32 is of a length such that when fully tightened, the distal end 32B of the locating screw 32, extends through a second aperture 30E and stops flush with the outer surface 30A of the collar 30. The recess 22I is provided with a slot 22K (FIGS. 1 and 2) to accommodate the head 32A of the locating screw 32. The slot 22K is located such that when correctly mounted within the recess 22I, the ornament 35 is in the facing forward position and is unable to turn relative to the adaptor 22.

The ornament 35 is provided with a circular base 35A upon which is mounted an extension portion 35B (FIG. 1). The extension portion 35B is preferably comprised of two U-shaped legs 35C spaced 180° apart on the perimeter 35E of the circular base 35A. The inner sides 35D of the legs 35C are connected by a middle wall 35F which extends from the apexes of the legs 35C to the circular base 35A perpendicular to the circular base 35A of the ornament 35 (FIG. 1). The ornament 35 is mounted onto the collar 30 with the extension portion 35B of the ornament 35 being completely encircled by the collar 30. In the preferred embodiment, the collar 30 is cylindrical in shape and is tapered to provide a better fit over the extension portion 35B of the ornament 35. The collar 30 is used to standardize all extension portions for a given ornament style. As originally constructed, the extension portions 35B are imprecise, which requires the need for the collar 30 to standardize the extension portion 35B in order that there is a better fit within the recess 22I of the adaptor 22. The exact configuration of the collar 30 will depend on the ornament 35 on which it is to be mounted. In the preferred embodiment, the extension portion 35B is mounted on the collar 30 by placing the locating screw 32 through a first aperture 30D in the collar 30 such that the locating screw 32 passes between the legs 35C of the extension portion 35B and extends through a hole in the middle wall 35F and into the second aperture 30E in the collar 30 to stop flush with the outer surface 30A of the collar 30 such that the locating screw 32 fastens the collar 30 onto the extension portion 35B of the ornament 35.

Once mounted on the adaptor 22, the ornament 35 and collar 30 are held in place within the recess 22I by a detent 40 (FIG. 4A). A detent is a device for holding one mechanical part in relation to another so that the device can be released by force applied to one of the parts and can take many well known forms. FIG. 4A shows the preferred embodiment, wherein the detent 40 is a ball 40A and spring 40B assembly located in an aperture 22L in the sidewall 22C of the adaptor 22 with a dimple 30C located in the outer surface 30A of the collar 30. In the preferred embodiment, the aperture 22L in the sidewall 22C of the adaptor 22 which houses the detent 40 extends parallel to the horizontal axis B—B through the entire width of the sidewall 22C and is provided with an opening 22M at both ends. The openings 22M enable the detent 40 to be inserted from outside the adaptor 22 such that the screw head 40C of the ball 40A and spring 40B assembly can be easily turned. As shown in FIG. 4A, the ball 40A of the detent 40 engages the dimple 30D in the outer surface 30A of the collar 30 which holds the collar 30 in the adaptor 22. In the preferred embodiment, the dimple 30C in the collar 30 is spaced 90° apart from the second aperture 30E where the distal end 32B of the locating screw 32 is flush with the outer surface 30A of the collar 30. To release the collar 30 and the ornament 35 from the adaptor 22, an upward vertical force is applied to the collar 30 and ornament 35. The force dislodges the ball 40A from the dimple 30C such that the detent 40 is defeated and the collar 30 and ornament 35 are separated from the adaptor 22. The use of a detent 40 to hold the ornament 35 and collar 30 in the adaptor 22 enables the ornament 35 to be quickly removed from the adaptor 22 while leaving the split pin 26 which is attached to the adaptor 22 in place. This allows the ornament 35 and collar 30 to retain the ability to tilt while acquiring the ability to be quickly removed. It will be noted that the detent 40 could also act as the locating means and replace the locating screw 32 depending upon the type of detent used. However, in the preferred embodiment, the detent 40 is separate from the locating means.

The ornament 35 which is mounted on the collar 30 is intended to be that which is normally mounted directly into the base 12. In the preferred embodiment, the ornament 35, with the extension portion 35B, is standard equipment on the vehicle, thus eliminating the need for the modifying of the manufacture of the ornament 35 itself. It is conceivable that in some embodiments the only additional part needed to make the original ornament 35 assembly removeable would be the adaptor 22.

Numerous variations will occur to those skilled in the art and it is intended that the present invention be limited only by the hereinafter appended claims.

I claim:

1. An assembly adapted for mounting on an engine hood of a vehicle and providing a quick release of a tiltable hood ornament which comprises:

(a) an adaptor means tiltably mounted on the hood of the vehicle having two opposed ends, one end mounted adjacent to the hood of the vehicle and the other end having a recess and with at least one outside side between the ends;

(b) a detachable hood ornament with an extension and with a collar mounted on the extension of the ornament, the collar having an inside wall and an opposite outside wall which fits into the recess of the adaptor means and wherein a detent means is provided between the collar and the adaptor means to hold the collar mounted on the extension of the ornament in the recess until released by pulling the ornament away from the other end of the adaptor means; and (c) resilient means mounted on the adaptor means and hood so as to bias the adaptor means towards the hood.

2. The assembly of claim 1 wherein the resilient means is a coil spring mounted adjacent to the hood and connected to a split pin with the split pin connected between the coil spring and the adaptor means through an opening in the hood of the vehicle so that the coil spring is compressed.

3. The assembly of claim 1 wherein the resilient means is a coil spring connected to the adaptor means through an opening in the hood of the vehicle so that the coil spring is compressed.

4. The assembly of claim 1 wherein the detent means is provided through the side of the adaptor means and into the recess of the adaptor means so as to engage a dimple in the collar mounted on the extension of the ornament.

5. The assembly of claim 1 wherein the collar is cylindrical.

6. The assembly of claim 1 wherein the extension is provided with an opening and wherein an opening is provided through a sidewall of the collar and wherein a locating pin means is inserted and secured through the openings to mount the collar on the extension.

7. The assembly of claim 6 wherein the locating pin means is a screw having a head.

8. The assembly of claim 7 wherein the head of the screw projects from the outside wall of the collar into a slot in the adaptor means so that the collar is located in position in the recess of the adaptor means.

9. An assembly adapted for mounting on an engine hood of a vehicle and providing a quick release of a tiltable hood ornament which comprises:

(a) a base means adapted to be mounted on the hood of the vehicle with an opening between opposed ends and with at least one side between the ends;

(b) an adaptor means tiltably mounted on the base means;

(c) a detachable hood ornament mounted on a collar which is mounted in a recess in the adaptor means in a relationship which allows the collar and the ornament to be pulled from and separated from the adaptor means by pulling the collar and the adaptor means apart wherein there is a detent means between the collar and the adaptor means to hold them together; and (d) resilient means mounted on the base means and on the adaptor means which biases the adaptor means towards the base means.

10. The assembly of claim 9 wherein the resilient means is a coil spring connected to a split pin with the split pin connected between the coil spring and the adaptor means through the opening in the base means so that the coil spring is compressed.

11. The assembly of claim 9 wherein the detent means is a ball and spring assembly.

12. The assembly of claim 9 wherein the resilient means is a coil spring connected to the adaptor means through the openings in the base means so that the coil spring is compressed.

13. An assembly adapted for mounting on an engine hood of a vehicle and providing a quick release of a tiltable hood ornament which comprises:

(a) a base means adapted to be mounted on the hood of the vehicle with an opening between opposed ends of the base means and with at least one side between the ends;

(b) an adaptor means tiltably mounted on the base means and having two opposed ends, one end mounted on the base means and the other end having a recess and with at least one outside side between the ends;

(c) a detachable hood ornament with an extension and with a collar mounted on the extension of the ornament, the collar having an inside wall and an opposite outside wall which fits into the recess of the adaptor means and wherein a detent means is provided between the collar and the adaptor means to hold the collar mounted on the extension of the ornament in the recess until released by pulling the ornament away from the other end of the adaptor means; and (d) resilient means mounted on the base means opposite the adaptor means and connected to the adaptor means through the opening in the base means so as to bias the adaptor means towards the base means.

14. The assembly of claim 13 wherein the detent means is provided through the side of the adaptor means and into the recess of the adaptor means so as to engage a dimple in the collar mounted on the extension of the ornament.

15. The assembly of claim 14 wherein the detent means is a ball and spring assembly.

16. The assembly of claim 13 wherein the collar is cylindrical.

17. The assembly of claim 13 wherein the inside wall of the collar is tapered.

18. The assembly of claim wherein the extension is provided with an opening and wherein an opening is provided through a sidewall of the collar which is cylindrical and wherein a pin means is inserted and secured through the openings to mount the collar on the extension.

19. The assembly of claim 18 wherein the pin means is a screw having a head.

20. The assembly of claim 19 wherein the head of the screw projects from the outside wall of the collar into a slot in the adaptor means so that the collar is located in position in the recess of the adaptor means.

21. An assembly adapted for mounting in the hood of a vehicle and providing a quick release of a tiltable hood ornament which comprises:

(a) a base means adapted to be mounted on the hood of the vehicle with an opening between opposed ends of the base means with at least one side between the ends;

(b) an adaptor means tiltably mounted on the base means and having two opposed ends, one end mounted on the base means and the other end having a recess and with at least one side between the ends and with a detent means mounted through the side of the adaptor means into the recess and with a slot in the recess of the adaptor means;

(c) a cylindrical collar having an inside wall and an opposite outside wall which fits into the recess of the adaptor means with the outside wall in contact with the adaptor means in the recess and with a dimple which receives the detent means and with a pin means which slides into the slot in the adaptor means;

(d) a detachable hood ornament having an extension at an end which is mounted in the cylindrical collar adjacent the inside wall of the cylindrical collar and having an opening in the extension located inside the cylindrical collar;

(e) a hook means split pin mounted through the opening in the base means and through a hole in the adaptor means; and (f) a coil spring mounted around the hook means split pin and adjacent to the opening in the base means in compression so that the hood ornament, cylindrical collar and adaptor means are urged into tiltable contact with the base means.

22. The assembly of claim 21 wherein the inside wall of the cylindrical collar is mounted on the extension by means of the pin means which passes through the opening in the extension and an opening in the cylindrical collar to secure the cylindrical collar on the extension.

23. The assembly of claim 22 wherein the pin means is a screw.

24. The assembly of claim 23 wherein the screw projects from the outside wall of the cylindrical collar into the slot in the adaptor means so that the cylindrical collar is located in position in the recess of the adaptor means.

25. The assembly of claim 21 wherein the sides of the base means and the adaptor means have dimensions which are identical.

26. The assembly of claim 21 wherein the coil spring has two opposed ends, one end of which is mounted on one side of the base means opposite the adaptor means and the other end of which is connected to the split pin to compress the coil spring.

27. The assembly of claim 26 wherein a first longitudinal axis through the opening in the base means is at an angle relative to a second longitudinal axis through the recess of the adaptor means.

28. The assembly of claim 21 wherein the inside wall of the cylindrical collar is tapered.

29. The assembly of claim 21 wherein the adaptor means is provided with a protrusion which fits between a first and second tab in the opening in the base means for preventing the adaptor means from rotating.

30. The assembly of claim 21 wherein the detent means is a ball and spring assembly.

31. An adaptor for providing a quick release of a tiltable hood ornament on a vehicle which comprises:

a body having an upper surface and a lower surface with at least one side between the upper surface and the lower surface and with a recess located in the upper surface;

a detent means mounted on the body for holding a collar mounted on an extension of the ornament in the recess until released by pulling the collar from the recess;

an attachment means provided on the bottom surface of the body for attaching to a resilient means for holding the adaptor on the hood; and a slot in the body in the upper surface of the body which is engagable by a locating head on the collar.

32. The adaptor of claim 31 wherein the attachment means is comprised of a protrusion having a hole through a plane perpendicular to the bottom surface of the body.

33. The adaptor of claim 31 wherein the resilient means is a coil spring connected to a split pin and wherein the attachment means is adapted to connect to the split pin.

34. The adaptor of claim 31 wherein the detent means is a ball and spring assembly.

35. The adaptor of claim 31 wherein the resilient means is a coil spring and wherein the attachment means is adapted to connect to the coil spring.

36. The adaptor of claim 31 wherein the detent means is provided through the side and into the recess of the body so as to engage a dimple in the collar mounted on the ornament which mounts in the recess.

* * * * *